(12) United States Patent
Sugiyama (10) Patent No.: US 11,604,116 B2
(45) Date of Patent: Mar. 14, 2023

(54) OPTICAL DEVICE HAVING TERRACE FOR MOUNTING OPTICAL CHIP COMPONENT AND METHOD OF TESTING OPTICAL DEVICE HAVING TERRACE FOR MOUNTING OPTICAL CHIP COMPONENT

(71) Applicant: Fujitsu Optical Components Limited, Kawasaki (JP)

(72) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 16 days.

(21) Appl. No.: 17/135,178

(22) Filed: Dec. 28, 2020

(65) Prior Publication Data

US 2021/0270698 A1 Sep. 2, 2021

(30) Foreign Application Priority Data

Feb. 28, 2020 (JP) .............................. JP2020-034066

(51) Int. Cl.
*G01M 11/00* (2006.01)
*G02B 6/42* (2006.01)

(52) U.S. Cl.
CPC ......... *G01M 11/331* (2013.01); *G02B 6/4206* (2013.01)

(58) Field of Classification Search
CPC .... G01M 11/331; G01M 11/33; G01M 11/02; G02B 6/4206; G02B 6/4202; G02B 6/122; G02B 6/124; G01R 31/311
See application file for complete search history.

(56) References Cited

U.S. PATENT DOCUMENTS

2017/0082799 A1 3/2017 Novack et al.
2019/0293866 A1 9/2019 Novack et al.

OTHER PUBLICATIONS

Office Action, dated Nov. 16, 2022, in corresponding Chinese Patent Application No. 202110181476.X (17 pp.).

*Primary Examiner* — Hwa Andrew Lee
(74) *Attorney, Agent, or Firm* — Staas & Halsey LLP (57) ABSTRACT

An optical device cut from a wafer into a chip by dicing, on the wafer, the optical device includes a plurality of optical waveguides; an optical circuit connected to the optical waveguide; and of the plurality of optical waveguides, a testing optical waveguide that guides test light to the optical circuit to be tested, by bypassing a non-connected optical waveguide portion at a terrace for mounting an optical chip component.

13 Claims, 7 Drawing Sheets

OPTICAL DEVICE HAVING TERRACE FOR MOUNTING OPTICAL CHIP COMPONENT AND METHOD OF TESTING OPTICAL DEVICE HAVING TERRACE FOR MOUNTING OPTICAL CHIP COMPONENT

CROSS REFERENCE TO RELATED APPLICATIONS

This application is based upon and claims the benefit of priority of the prior Japanese Patent Application No. 2020-034066, filed on Feb. 28, 2020, the entire contents of which are incorporated herein by reference.

FIELD

Embodiments discussed herein relate to an optical device and a method of testing an optical device.

BACKGROUND

An optical device is provided in the form of an optical IC chip and examples of the optical IC chip include an optical receiving unit (Rx) that receives an optical signal and an optical transmitting unit (Tx) that transmits an optical signal. An optical waveguide, an optical circuit, an optical chip component, etc. are disposed on the optical IC chip. The optical circuit is, for example, a polarizing beam splitter (PBS), a polarization rotator (PR), a 90° optical hybrid, etc. The optical chip component is, for example, a semiconductor optical amplifier (SOA), etc.

For testing the optical circuit, there is a method in which an optical signal is input to the optical circuit from an end face of the optical IC chip via an optical fiber. There is also a method in which an optical circuit is tested in a wafer state before being made into IC chips (see, e.g., Specification of U.S. Laid-Open Patent Publication No. 2019/0293866). In this method, a grating coupler (GC) is disposed in a portion of the wafer other than the region of the optical IC chip to be measured, whereby an optical signal is input to the optical circuit via the optical waveguide extending beyond the dicing line. As a result, light may be input to the optical IC chip by inputting light from a wafer surface direction with the fiber (fiber array) arranged close to the GC, thereby enabling the optical circuit on the wafer to be tested in the wafer state before dicing.

SUMMARY

According to an aspect of an embodiment, an optical device cut from a wafer into a chip by dicing, on the wafer, the optical device includes: a plurality of optical waveguides; an optical circuit connected to the optical waveguide; and of the plurality of optical waveguides, a testing optical waveguide that guides test light to the optical circuit to be tested, by bypassing a non-connected optical waveguide portion at a terrace for mounting an optical chip component.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF THE INVENTION

First, problems associated with the conventional techniques are discussed. In testing optical IC chips obtained by dicing, however, test light has to be input into the optical waveguide from an end face of the optical IC chip. In this case, each of the optical IC chips has to be set one by one on a stage to align the optical fiber, resulting in increased time and effort for testing.

In the case of performing testing of the optical IC chips at a step previous to dicing, the following problem occurs. The above optical chip component, e.g., the SOA is formed from a compound semiconductor. For this reason, a deep groove (terrace) for mounting the SOA is formed in a wafer (substrate) at a wafer process step. And, after the wafer is diced into a chip, the SOA is mounted on the terrace by bonding, etc., whereby the SOA transmits incident light to the subsequent optical waveguide.

Thus, in the wafer state before the wafer is diced into chips, the SOA is not mounted on the terrace and therefore, the optical waveguide is in a non-connected state at the terrace. In this state, when an optical signal is input into the optical IC chip by using the GC, the optical signal cannot be guided to the optical circuit subsequent to the terrace, rendering it impossible to test the optical circuit of the optical IC chip in the wafer state.

An embodiment of an optical device is described in detail with reference to the accompanying drawings. In the embodiment, as an optical IC chip having an optical circuit, an optical receiving unit (Rx) is described as an example of the optical device. In an instance of an optical transmitting unit (Tx) as the optical IC chip, the optical transmitting unit (Tx) also has substantially the same configuration and description is similarly applicable to the optical transmitting unit.

The optical IC chip described below enables various tests to be performed with respect to the optical circuit of the optical IC chip in a wafer state before dicing. As described above, in the optical IC chip in the wafer state, the optical chip component of a compound semiconductor formed into a chip, e.g., the SOA is not mounted on a wafer (substrate after being formed into chips) and as a result, transmission of an optical wave guided by the optical waveguide terminates at a portion where the SOA is to be mounted.

Figure 1:
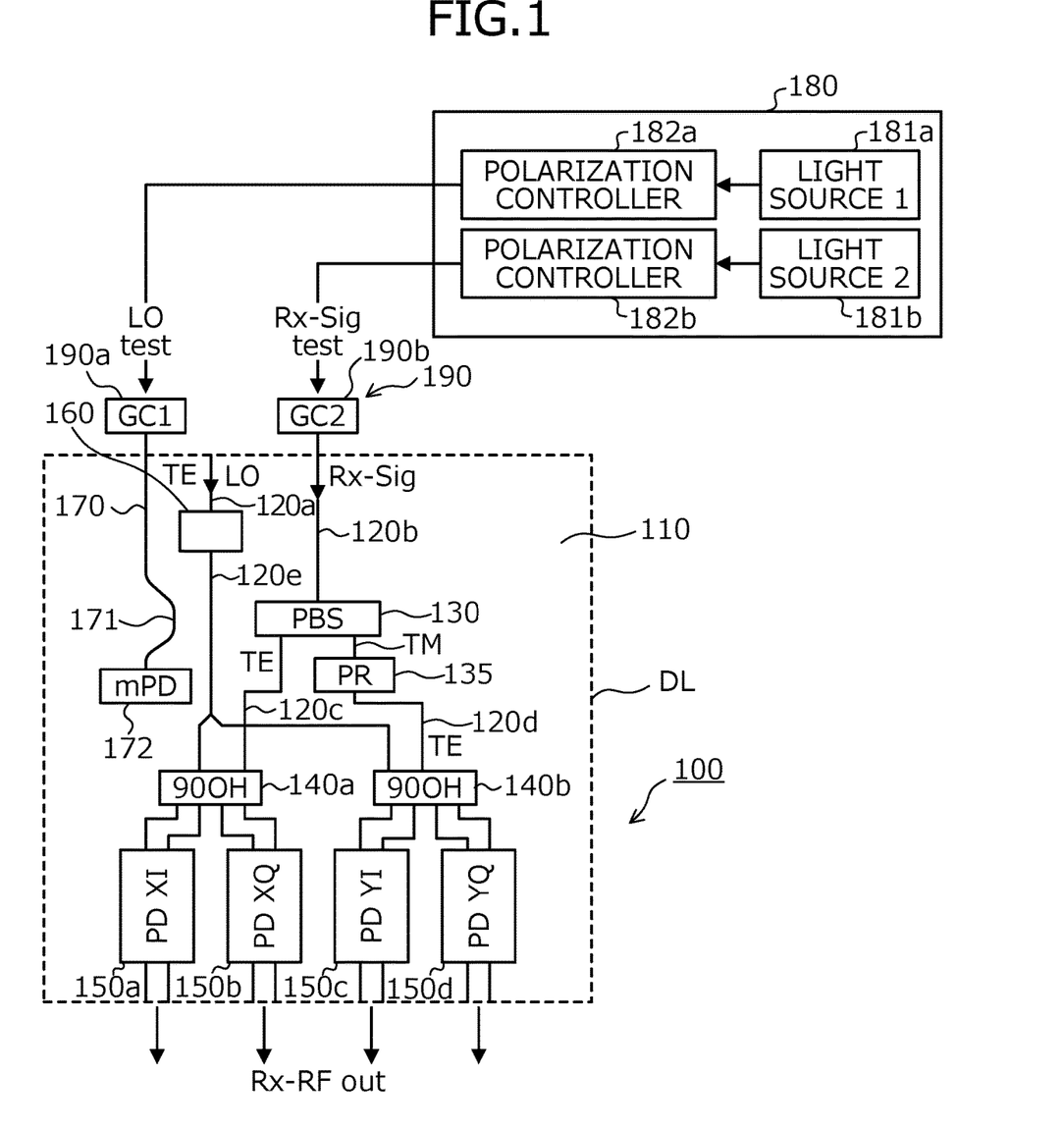
FIG. 1 is a plan view depicting a first configuration example of an optical device according to an embodiment.

In a configuration depicted in FIG. 1, the optical circuit such as a polarization beam splitter (PBS), a polarization rotator (PR), and a 90° optical hybrid, and the optical waveguide excluding the SOA may be formed on the wafer in the pre-diced wafer state.

In this manner, when the optical circuit of the optical IC chip is tested in a state without the SOA being mounted thereto, transmission of the optical wave guided by the optical waveguide terminates at the SOA portion, whereby test light cannot be guided to the optical circuit subsequent to the SOA, making it impossible to perform the optical IC chip testing. Thus, the embodiment enables optical circuit testing by allowing test light to enter the optical circuit via a testing optical waveguide used for testing, in such a manner as to bypass the non-connected optical waveguide where transmission of a guided optical wave terminates.

FIG. 1 is a plan view depicting a first configuration example of the optical device according to the embodiment. A wafer 100 of the embodiment is fabricated using silicon (Si), for example. Use of Si in the wafer 100 enables integration and reduction in the element size of the optical circuit disposed on the Si substrate. Note, however, that Si has greater optical loss as compared to a glass substrate for a planar optical wave circuit (PLC). For this reason, in the case of using Si for the wafer 100, the SOA is arranged as the optical circuit on the wafer 100 to amplify optical signals.

In FIG. 1, a region surrounded by a dicing line DL (dotted line) on the wafer 100 represents an optical IC chip 110 used as the optical receiving unit (Rx). An optical waveguide that guides optical signals and various optical circuits are disposed on the optical IC chip 110.

A testing device 180 inputs TE and TM polarized test lights to the optical circuits of the optical IC chip 110 that handles polarized multiplex signals. The testing device 180 includes light sources 181 and polarization controllers 182. Light emitted from a light source 1 (181a) is supplied as local light (LO) to the optical chip 110 via a polarization controller 182a. Light emitted from a light source 2 (181b) is supplied as signal light (Rx-Sig) to the optical IC chip 110 via a polarization controller 182b. For example, the polarization controller 182a supplies local light obtained by TE polarization of light from the light source 1 (181a). The polarization controller 182b supplies signal light obtained by switching light from the light source 2 (181b) to TE polarization or TM polarization. The signal light is a TE polarized or TM polarized multivalued signal for testing.

In the optical IC chip 110 prepared as a product by dicing along the dicing line to form chips to which chips such as the SOA are mounted, local light (LO) is input to an optical waveguide 120a and signal light (Rx-Sig) is input to an optical waveguide 120b. Local light (LO) is emitted from a light source of the optical receiving unit (Rx) and is input from one end of the optical waveguide 120a located at an end face portion of the optical IC chip 110. Signal light (Rx-Sig) is such that light transmitted from an external optical transmission path of the optical receiving unit (Rx) is input from one end of the optical waveguide 120b located at the end face portion of the optical IC chip 110.

Local light input via the optical waveguide 120a is optically amplified by the SOA mounted on a terrace 160 portion and enters a first 90° optical hybrid (900H) 140a and a second 90° optical hybrid (900H) 140b.

Signal light input via the optical waveguide 120b is split into TM light and TE light by a polarizing beam splitter (PBS) 130. TE light transmitted from the PBS 130 is input to the first 90° optical hybrid (900H) 140a via an optical waveguide 120c. TM light transmitted from the PBS 130 is polarization-rotated into TE light by a polarization rotator (PR) 135 and is input to the second 90° optical hybrid (900H) 140b via an optical waveguide 120d.

Local light and signal light enter the first 90° optical hybrid (900H) 140a, signals of different phases are separated and are received by photo detectors (PDs) 150a and 150b. The PD 150a outputs an XI-component electrical signal and the PD 150b outputs an XQ-component electrical signal (Rx-RF). Local light and signal light enter the second 90° optical hybrid (900H) 140b, signals of different phases are separated and are received by PDs 150c and 150d. The PD 150c outputs a YI-component electrical signal and the PD 150d outputs a YQ-component electrical signal (Rx-RF).

In the embodiment, at the time of testing of the optical IC chip 110, test light (local light and signal light) transmitted by the testing device 180 is input to the optical IC chip 110 by using grating couplers (GCs) 190. Therefore, regions for the GCs 190 are provided on the wafer 100 of the optical IC chip 110. In the example of FIG. 1, the GCs 190 are arranged on the wafer 100 outside the region of the optical IC chip 110. For local light, a GC 1 (190a) arranged on the wafer 100, outside of the optical IC chip 110, is used. For input of signal light, a GC 2 (190b) arranged on the wafer 100, outside the optical IC chip 110, is used.

At this time, as depicted in FIG. 1, the optical IC chip 110 in the wafer state, i.e., the optical IC chip 110 before being cut off along the dicing line DL is not yet mounted with the SOA and therefore, the terrace 160 is present at the portion where the SOA is to be mounted. In the embodiment, testing is performed without the SOA being mounted on the optical IC chip 110 and therefore, while no reference numeral is assigned to the SOA, the SOA is mounted on the terrace 160 portion by bonding after dicing.

In this manner, even when local light is input to the optical waveguide 120 at the end face of the optical IC chip 110 in the wafer state to perform testing without the SOA being mounted on the optical IC chip 110, the light guide is not connected at the terrace 160 portion. Therefore, in this state, local light cannot be guided to an optical waveguide 120e and the optical circuits (90° optical hybrids (900H)) 140a and 140b downstream from the terrace 160. In this case, the optical circuits (90° optical hybrids (900H) 140a and 140b, etc.) arranged downstream from the SOA cannot be tested. The optical circuits to be tested in the embodiment are for example the 90° optical hybrids (900H) 140a and 140b.

Thus, the embodiment is configured such that the terrace 160 portion is bypassed so local light input to the optical IC chip 110 enters the 90° optical hybrids (900H) 140a and 140b, which are the optical circuits downstream, without passing through the terrace 160 portion.

In the example depicted in FIG. 1, an optical waveguide 170 for testing is disposed adjacent to the optical waveguide 120a for local light and adjacent to the terrace 160 at a side thereof. At the time of testing the optical IC chip 110, the optical waveguide 170 for testing is connected at a first end thereof to the GC 190a for local light transmitted by the testing device 180. The optical waveguide 170 for testing is connected at a second end thereof to an optical coupler, e.g., a directional coupler 171.

The directional coupler 171 is configured using a 2×2 tap coupler for optical multiplexing at the optical waveguide 120e portion downstream from the terrace 160 and has a branch output to a light-receiving monitor 172. The directional coupler (2×2 tap coupler) 171 has two inputs one of which is connected to the optical waveguide 120e subsequent to the terrace 160 and the other of which is connected to the optical waveguide 170 for testing. The directional coupler (2×2 tap coupler) 171 has two outputs one of which is coupled to the optical waveguide 120e to guide optical signals to the subsequent optical circuits and the other of which branches light and outputs the light to the light-receiving monitor 172.

The light-receiving monitor 172 is configured from a light-receiving element such as an mPD. For example, the light-receiving monitor 172 is disposed for amplification control of the SOA to be mounted later. The light-receiving monitor 172 detects an optical level (received current) of the branch output of the directional coupler 171. A control unit not depicted disposed in the receiving unit (Rx) controls an optical amplification degree of the SOA in a feedback manner, based on the optical level of the light-receiving monitor 172.

Testing in the wafer state in which the SOA is not mounted on the optical IC chip 110 as depicted in FIG. 1 is described. In this case, for the optical IC chip 110, local light (LO) is input from the GC 1 (190*a*) and signal light (Rx-Sig) is input from the GC 2 (190*b*).

Local light input from the GC 1 (190*a*) may then be guided from the optical waveguide 170 for testing to the optical waveguide 120*e* via the directional coupler 171. Via the optical waveguide 120*e*, this local light may be input to the 90° optical hybrids (900H) 140*a* and 140*b* that are the optical circuits downstream from the terrace 160. The 90° optical hybrids (900H) 140*a* and 140*b* each cause local light and signal light to interfere with each other so that electrical signals (Rx-RF) of XI, XQ, YI, and YQ components may be output.

As a result, in the SOA-unmounted wafer state, plural optical IC chips 110 may be tested by the testing device 180. After the testing of the optical IC chips 110 in the wafer state, the optical IC chips 110 are separated from the wafer 100 along the dicing line DL and thereafter, the SOA is mounted on the terrace 160 portion of each of the optical IC chips 110 by bonding.

The optical IC chip 110 completed by mounting the SOA receives local light through the optical waveguide 120*a* at the end face portion via an optical fiber, etc. and receives signal light through the optical waveguide 120*b* at the end face portion, thereby functioning as the optical receiving unit (Rx). The GCs 190 and the optical waveguide 170 for testing are used only during testing and, after completion of the optical IC chip 110, the input of light using the GCs 190 is not performed and therefore, light does not enter the optical waveguide 170 for testing.

In this manner, according to the optical IC chip 110 of the embodiment, plural optical IC chip 110 portions on the wafer 100 may be tested in a production process before dicing. Consequently, the labor of the operator required for testing may be reduced and the time taken for testing (throughput) may be improved.

Figure 2:
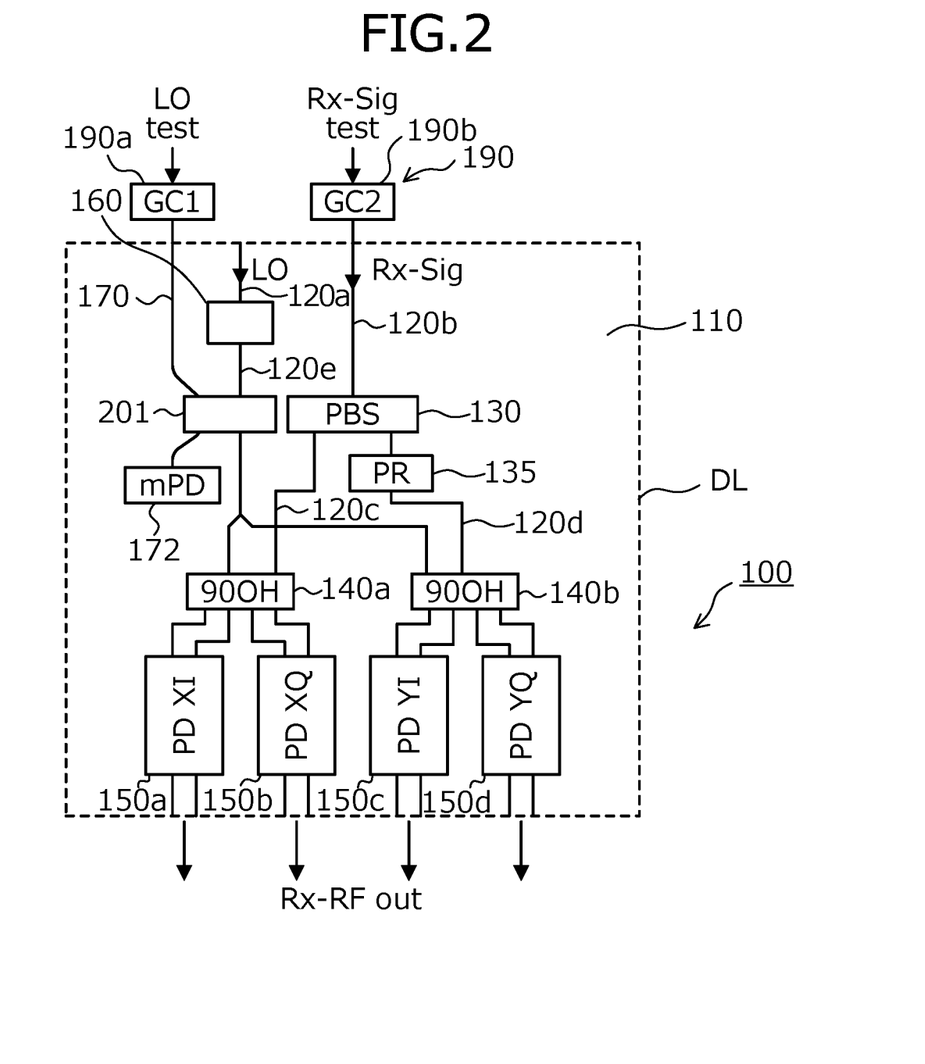
FIG. 2 is a plan view depicting a second configuration example of the optical device according to the embodiment.

FIG. 2 is a plan view depicting a second configuration example of the optical device according to the embodiment. In the second configuration example, the same reference numerals are assigned to components similar to those of the first configuration example (FIG. 1). The optical IC chip 110 of the second configuration example uses a 2(inputs)×2 (outputs) multimode interference (MMI) coupler 201 as the optical coupler. Although in the first configuration example (FIG. 1), the branching ratio of the directional coupler 171 has wavelength dependent properties, use of the MMI coupler 201 of the second configuration example (FIG. 2) achieves wavelength independence, thereby enabling testing to be carried out with high accuracy.

Figure 3:
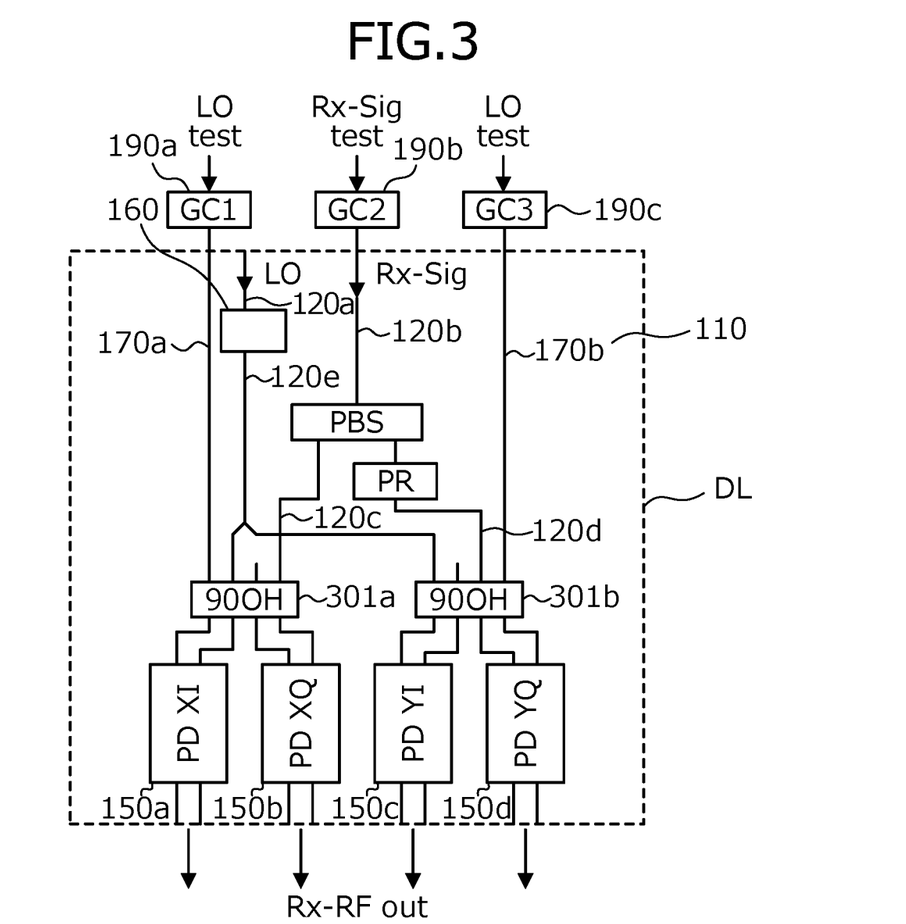
FIG. 3 is a plan view depicting a third configuration example of the optical device according to the embodiment.

FIG. 3 is a plan view depicting a third configuration example of the optical device according to the embodiment. In the third configuration example, the same reference numerals are assigned to components similar to those of the first configuration example (FIG. 1). The optical IC chip 110 of the third configuration example has a configuration in which inputs of 90° optical hybrids (900H) 301 are used in place of the directional coupler (tap coupler) 171 for branch output to the light-receiving monitor (mPD) 172 used in the first configuration example (FIG. 1).

4×4 couplers, e.g., 4×4 MMI couplers are used as the 90° optical hybrids (900H) 301 depicted in FIG. 3. When one input of four inputs of this 4×4 coupler is used for input of signal light (Rx-Sig) and another one input thereof is used for input of local light (LO), remaining two inputs are unused. One of these remaining two inputs is used for input of local light (LO) for testing from the GC 1 (190*a*) and a GC 3 (190*c*).

In the third configuration example, the two GCs (GC 1 (190*a*) and GC 3 (190*c*)) are used for inputting local light (LO) during testing of the optical IC chip 110. Local light input from the GC 1 (190*a*) enters a first 90° optical hybrid (900H) 301*a* via an optical waveguide 170*a* for testing. Local light input from the GC 3 (190*c*) enters a second 90° optical hybrid (900H) 301*b* via an optical waveguide 170*b* for testing. In this manner, configuration may be such that the couplers each having two or more inputs are used as the 90° optical hybrids (900H) 301 that are the optical circuits and configuration may be such that one of the inputs of the couplers is connected to the GC 190.

The third configuration example is configured to use two GCs, i.e., the GC1 (190*a*) and the GC 3 (190*c*). Without being limited hereto, configuration may be such that only the GC 1 (190*a*) is used to optically branch test light transmitted from the GC 1 (190*a*) inside or outside the optical IC chip 110, for input to the two 90° optical hybrids (900H) 301*a* and 301*b*.

Figure 4:
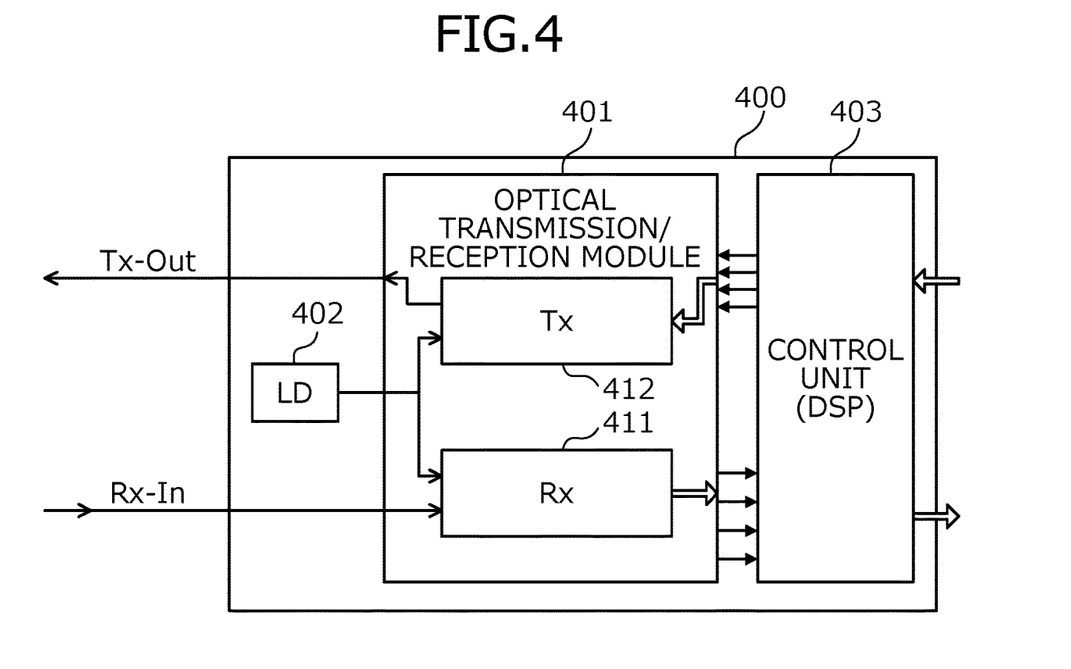
FIG. 4 is a view depicting a configuration example of a transmission/reception module to which the optical device according to the embodiment is mounted.

FIG. 4 is a view depicting a configuration example of a transmission/reception module to which the optical device according to the embodiment is mounted. An optical transmission/reception module 400 includes an optical transmission/reception package 401, a light source 402 such as an LD, and a control unit 403 such as a DSP. The optical transmission/reception package 401 has an optical receiving unit (Rx) 411 including the above optical IC chip 110 and an optical transmitting unit (Tx) 412 including the above optical IC chip 110 as well.

The optical receiving unit (Rx) 411 receives signal light (Rx-In) transmitted via an optical fiber and local light (LO) from the light source 402 and outputs an electrical signal (Rx-RF) obtained by demodulating signal light to the control unit 403. The optical transmitting unit (Tx) 412 receives a transmission signal input from the control unit and local light (LO) from the light source 402 and outputs, to an optical fiber, signal light (Tx-Out) obtained by modulating the transmission signal.

The control unit 403 controls operation of the optical transmission/reception package 401 (optical receiving unit 411 and optical transmitting unit 412) and operation of the light source 402 and controls input/output of the optical signal and electrical signal in the optical transmission/reception module 400.

While the SOA-mounted optical receiving unit (Rx) 411 has been described as an example of the optical IC chip 110 in the above configuration examples, the optical transmitting unit (Tx) 512 is also mounted with the SOA. A configurational difference between the optical receiving unit (Rx) 411 and the optical transmitting unit (Tx) 412 lies in that the optical receiving unit (Rx) 411 uses the light-receiving monitor 172 but the optical transmitting unit (Tx) 412 uses an optical modulator arranged instead of the light-receiving monitor. This enables testing for the SOA-unmounted optical IC chip 110 to be carried out efficiently on the optical transmitting unit (Tx) 412 similarly to the example described for the optical receiving unit (Rx) 411.

Figure 5:
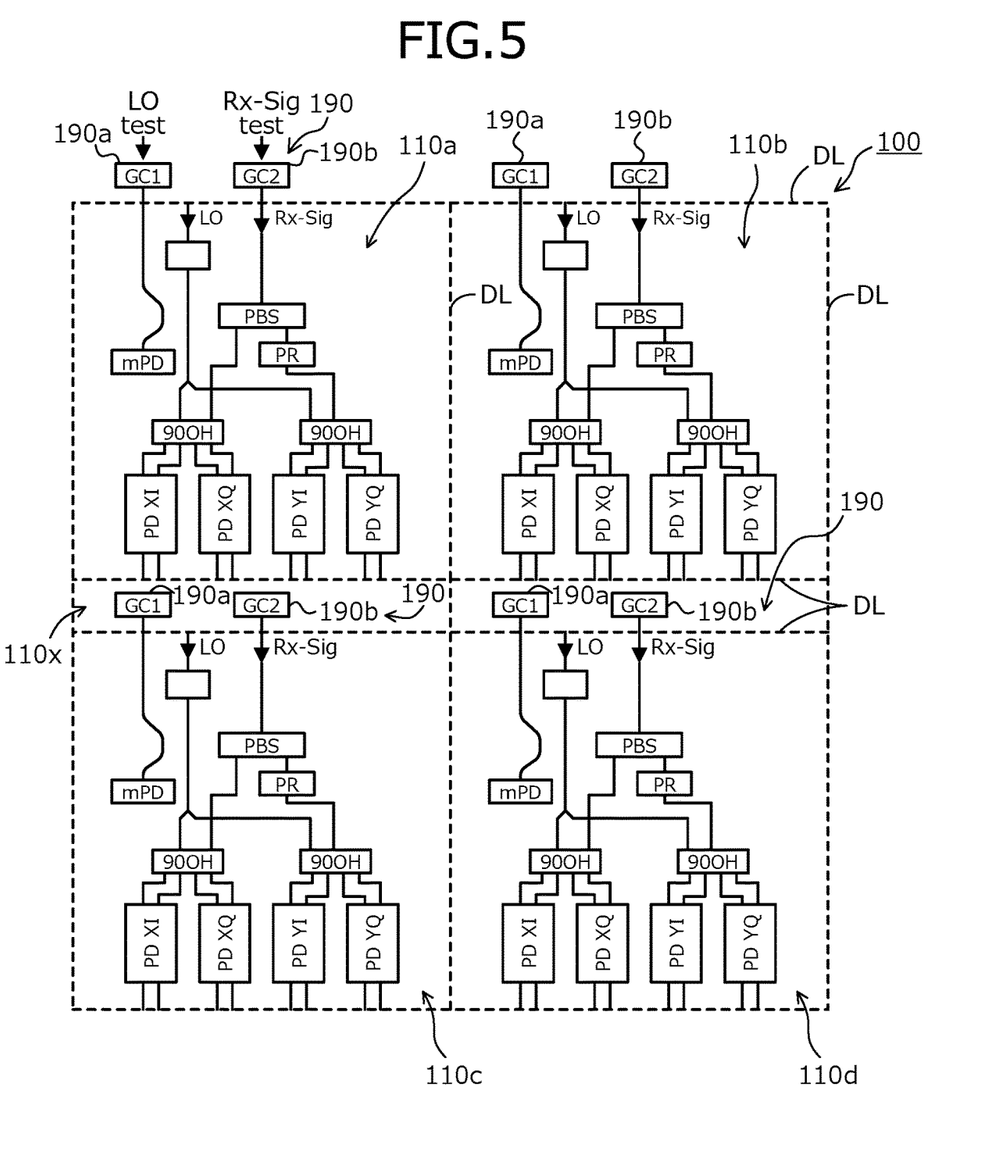
FIG. 5 is a plan view depicting a first arrangement example on a wafer of the optical device according to the embodiment.

FIG. 5 is a plan view depicting a first arrangement example on a wafer of the optical device according to the embodiment. An arrangement example will be described where the above-described optical IC chips 110 are arranged on the wafer 100. In the first arrangement example, the GCs 190 are arranged outside the regions of four optical IC chips 110 (110a to 110d).

As depicted in FIG. 5, the GCs 190 are arranged on the wafer 100 outside the regions defined by the dicing lines DL of the optical IC chips 110. For example, the GCs 190a and 190b for testing of the optical IC chip 110c are arranged on the wafer 100 outside the region of the dicing line DL at an upper portion in FIG. 5 of the optical IC chip 110c. Similarly, the GCs 190a and 190b for testing of the optical IC chip 110d are arranged on the wafer 100 outside the region of the dicing line at the upper portion in FIG. 5 of the optical IC chip 110d. Note that the GCs 190a and 190b for testing of the optical IC chips 110a and 110b are positioned at an upper end on the wafer 100 outside the regions of the optical IC chips 110a and 110b.

According to the first arrangement example, when the four optical IC chips 110 are each diced by the dicing lines DL, the GCs 190 do not remain on the OP IC chips (110a to 110d) after dicing. That is, according to the first arrangement example, the diced optical IC chips 110 do not include the GCs 190 that are used only during the testing in the wafer state, thereby enabling extra components to be removed from the optical IC chips 110. In the first arrangement example, a region 110x on the wafer 100 at the portions of the GCs 190 arranged between the adjacent optical IC chips 110 is discarded as an unnecessary region.

Figure 6:
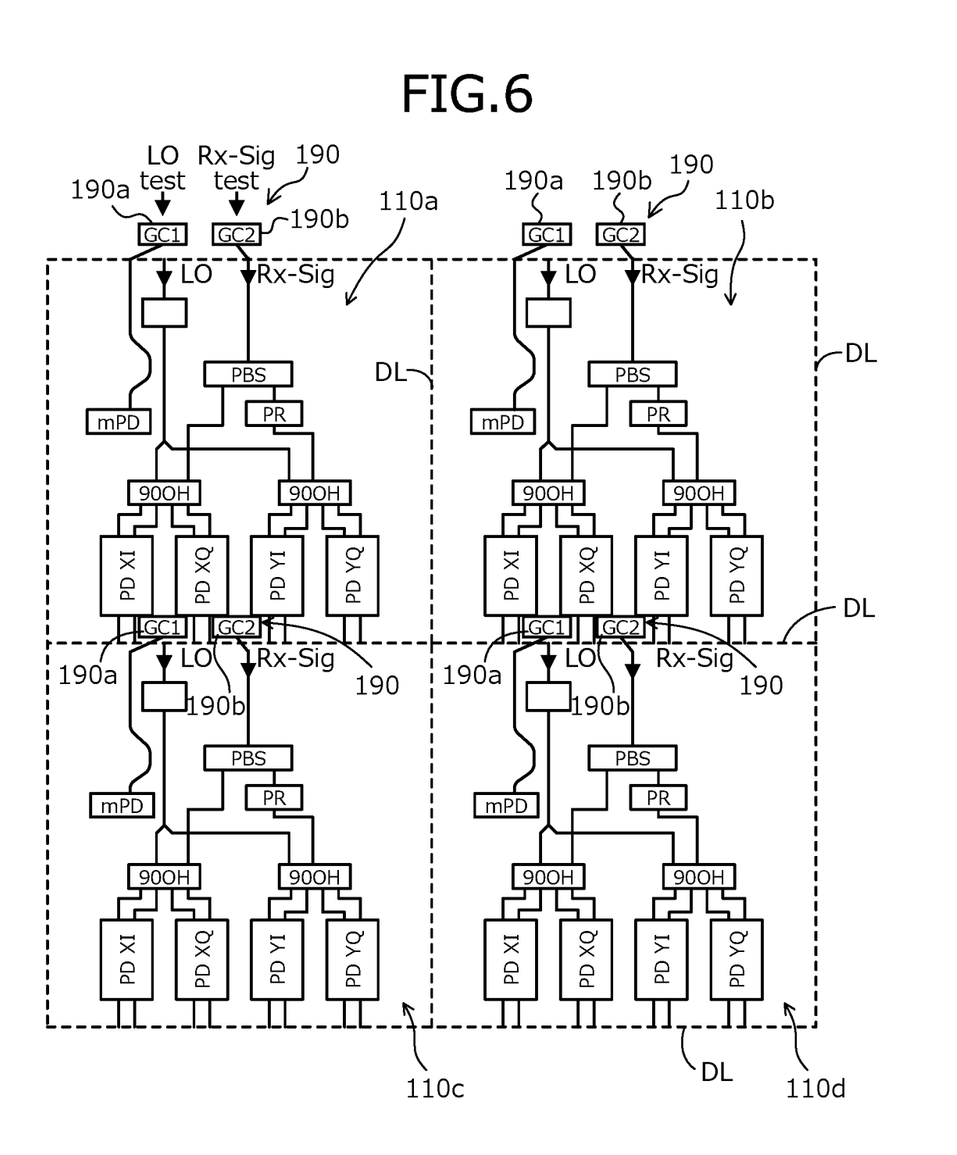
FIG. 6 is a plan view depicting a second arrangement example on the wafer of the optical device according to the embodiment.

FIG. 6 is a plan view depicting a second arrangement example on the wafer of the optical device according to the embodiment. In the second arrangement example depicted in FIG. 6, the GCs 190 are arranged on the regions of the adjacent optical IC chips 110 (110a to 110d).

As depicted in FIG. 6, the GC 1 (190a) and GC 2 (190b) for testing of the optical IC chips 110 are arranged on regions of an adjacent optical IC chip 110 of the adjacent optical IC chips 110. For example, the GC 1 (190a) and GC2 (190b) for the optical IC chip 110c are arranged on free regions in the optical IC chip 110a adjacent thereto (thereabove) in FIG. 6, e.g., regions between the PDs 150.

In the second arrangement example, when each of the four optical IC chips 110 are diced along the dicing lines DL, the GCs 190 used in testing of the adjacent optical IC chip 110 remain within the regions of the diced optical IC chips 110 (110a to 110d). Note that the GCs 190 for the optical IC chips 110a and 110b positioned at the end of the wafer 100 remain on the end region of the wafer 100, due to absence of the adjacent optical IC chips 110.

According to this the second arrangement example, while the GCs 190 used in testing of the adjacent optical IC chips 110 remain on the diced optical IC chips 110, the GCs 190 are arranged on free regions and therefore, the optical IC chips 110 may be diced as efficiently as possible. For example, the unnecessary regions 110x produced in the first arrangement example do not occur and accordingly, more of the optical IC chips 110 may be arranged, enabling as many as possible to be arranged on the wafer 100. Note that the GCs 190a and 190b for testing of the optical IC chips 110a and 110b are at unnecessary positions at the upper end of the wafer 100 outside the regions of the optical IC chips 110a and 110b and accordingly do not interfere with the arrangement efficiency of the optical IC chips 110.

Figure 7:
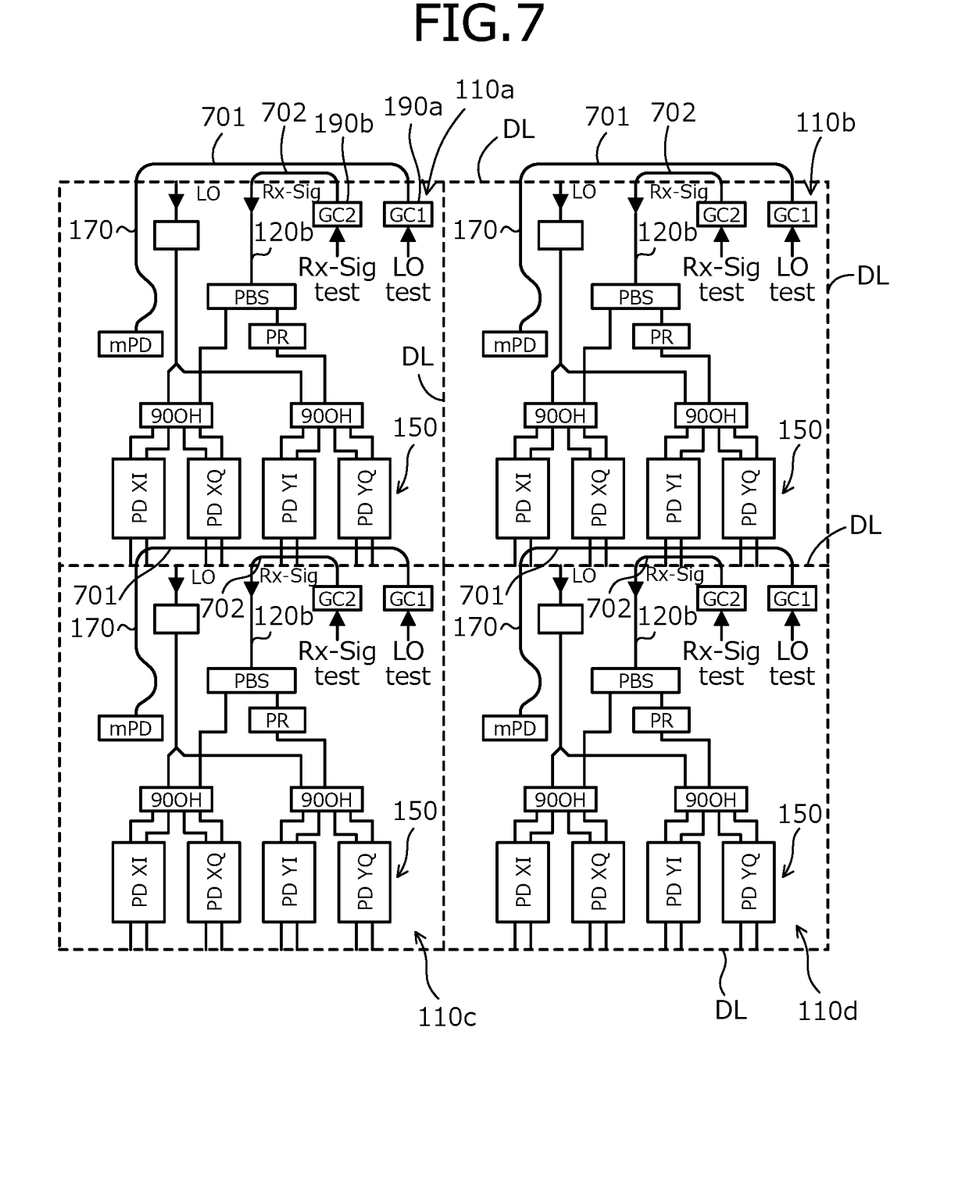
FIG. 7 is a plan view depicting a third arrangement example on the wafer of the optical device according to the embodiment.

FIG. 7 is a plan view depicting a third arrangement example on the wafer of the optical device according to the embodiment. In the third arrangement example, the GCs 190 are arranged within regions of the optical IC chips 110 (110a to 110d) respectively corresponding thereto.

As depicted in FIG. 7, the GC 1 (190a) and the GC 2 (190b) are arranged on a corresponding optical IC chip 110. For example, the GC 1 (190a) and the GC 2 (190b) for the optical IC chip 110c are arranged on a free region, e.g., on an upper right side within the optical IC chip 110c.

An optical waveguide 701 extending between the GC 1 (190a) for input of local light (LO) of the optical IC chip 110c and the optical waveguide 170 for testing are disposed across the dicing line DL by way of the optical IC chip 110a adjacent above. Similarly, an optical waveguide 702 extending between the GC 2 (190b) for input of signal light (Rx-Sig) of the optical IC chip 110c and the optical waveguide 120b are disposed across the dicing line DL by way of the optical IC chip 110a adjacent above. Although these optical waveguides 701 and 702 intersect with signal outputs of the light-receiving elements (PDs) 150 when viewed in a plan view, these optical waveguides 701 and 702 and the signal lines of the light-receiving elements (PDs) 150 may be arranged in different layers on the Si substrate.

In the third arrangement example, when the four optical IC chips 110 are each diced along the dicing lines DL, the GCs 190 used in testing of the optical IC chips 110 remain on the diced optical IC chips 110 (110a to 110d). Furthermore, as a result of dicing, the optical IC chip 110c for example does not have within a region thereof the portions of the optical waveguides 701 and 702 positioned outside of the dicing line of the optical IC chip 110c.

According to the third arrangement example, although the optical IC chips 110 after dicing have thereon the GCs 190 used in testing thereof, the optical IC chips 110 may be diced as efficiently as possible since the GCs 190 are arranged on free regions. For example, the unnecessary region 110x produced in the first arrangement example does not occur and accordingly, more of the optical IC chips 110 may be arranged, enabling as many as possible to be arranged on the wafer 100.

As set forth hereinabove, the optical device includes, on the wafer, the optical waveguides, the optical circuits connected to the optical waveguides, and the testing optical waveguide that guides test light to the optical circuit to be tested, by bypassing an optical waveguide portion that is not connected due the terrace for mounting the optical chip component of the optical waveguide. As a result, by supplying test light via the grating coupler to the testing optical waveguide of the optical device, all the optical circuits including the optical circuit downstream from the terrace may be tested so that testing of the optical device may be carried out in the wafer state before dicing.

The optical device may have on the wafer, the grating coupler that couples the test light to the optical waveguide. This enables test light to enter the optical device via the grating coupler in the wafer state before dicing so that testing of the optical components may be performed.

The optical device may be configured such that the testing optical waveguide is optically coupled to the optical circuit via the optical coupler. This enables test light of the testing optical waveguide to be guided to the optical circuit via the optical coupler.

The wafer of the optical device may be formed from a silicon material, whereas the optical chip component mounted on the terrace after dicing may be formed using a compound semiconductor. As a result, the optical device may be integrated.

The optical chip component on the optical device may be the semiconductor optical amplifier (SOA) that optically amplifies test light. This enables compensation of the optical loss by the SOA in the case of using the silicon material for the wafer. The SOA may be mounted on the terrace after dicing.

In the optical device, local light is input to the optical waveguide having the terrace on which the optical chip component is mounted and the testing optical waveguide guides local light as test light to the optical circuit to be tested. As a result, in the wafer state, even when the SOA is not mounted, local light may be guided to the optical circuit subsequent to the SOA via the testing optical waveguide, thereby enabling the optical circuit to be tested.

The optical device may use the directional optical coupler, the MMI coupler, etc. as the optical coupler. As a result, by using an optical coupler corresponding to the polarization dependence, more suitable test light may be guided to the optical circuit to be tested.

For the optical devices, the grating couplers thereof may be disposed outside the regions of optical devices formed into chips by dicing. Consequently, the grating couplers used only for testing in the wafer state do not remain on the optical devices after dicing, thereby enabling removal of extra components from the chips of the optical devices.

For the optical device, the grating couplers thereof may be disposed in a free region of an adjacent optical device of the optical devices formed into chips by dicing. This enables the optical devices to be diced as efficiently as possible. For example, without producing unnecessary regions on the wafer, as many optical devices as possible may be arranged on the wafer.

For the optical device, the grating couplers thereof may be disposed in a free region of an optical device to which the grating couplers belong, of optical devices formed into chips by dicing. As a result, the optical devices may be diced as efficiently as possible. For example, without producing unnecessary regions on the wafer, as many optical devices as possible may be arranged on the wafer.

For the optical device, the optical circuit that is to be tested and that receives test light may be the 90° optical hybrid. As a result, in the SOA-unmounted wafer state, test light may be input to the 90° optical hybrid disposed downstream from the SOA, thereby enabling testing of the 90° optical hybrid in the wafer state.

Thus, according to the embodiment, even when the optical waveguide is not connected due the terrace in the optical device, in the wafer state before being formed into chips, test light from the grating coupler may be guided to the optical circuit downstream from the terrace via the testing optical waveguide. For example, in the wafer state in which the SOA is not mounted on the terrace, i.e., in the production process before dicing, plural optical devices on the wafer may efficiently be tested. Since the plural optical devices may be tested with a single wafer being set on the stage, the labor of the operator necessary for testing may be reduced and the time taken for testing (throughput) may be improved.

According to an embodiment, an optical device may be tested efficiently in the wafer state.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical device cut from a wafer into a chip by dicing, the optical device comprising:
   a plurality of optical waveguides to which a local light is to be input;
   a terrace that is disposed between the optical waveguides and on which an optical chip component is to be mounted;
   an optical circuit connected downstream of the optical waveguides; and
   a testing optical waveguide that bypasses the terrace and guides a test local light to the optical circuit to be tested.

2. The optical device according to claim 1, wherein a grating coupler that inputs the test local light to the testing optical waveguide is disposed on the wafer.

3. The optical device according to claim 1, wherein the testing optical waveguide is optically connected to the optical circuit via an optical coupler.

4. The optical device according to claim 1, wherein the wafer is formed using a silicon material, and the optical chip component is a compound semiconductor.

5. The optical device according to claim 4, wherein the optical chip component is a semiconductor optical amplifier that optically amplifies the local light.

6. The optical device according to claim 3, wherein the optical coupler is a directional optical coupler.

7. The optical device according to claim 3, wherein the optical coupler is an MMI coupler.

8. The optical device according to claim 2, wherein the wafer includes a plurality of optical devices to be cut from the wafer into chips by the dicing, and the grating coupler is disposed in a region of the wafer outside of the optical devices.

9. The optical device according to claim 2, wherein the wafer includes a plurality of optical devices to be cut from the wafer into chips by the dicing, and among the optical devices, the grating coupler is disposed in a free region of an adjacent optical device that is adjacent to the optical device.

10. The optical device according to claim 2, wherein the wafer includes a plurality of optical devices to be cut from the wafer into chips by the dicing, and among the optical devices, the grating coupler is disposed in a free region of the optical device to which the grating coupler inputs the test local light via the testing optical waveguide.

11. The optical device according to claim 1, wherein the optical circuit that is to be tested and receives the test local light is a 90° optical hybrid.

12. The optical device according to claim 1, wherein the optical device is disposed in an optical receiving unit that receives an optical signal from a transmission path or in an optical transmitting unit that transmits an optical signal to the transmission path.

13. A method of testing an optical device cut from a wafer into a chip by dicing, the method comprising:
    disposing, a plurality of optical waveguides to which a local light is to be input, a terrace that is disposed between the optical waveguides and on which an optical chip component is to be mounted, an optical circuit connected downstream of the optical waveguides, a testing optical waveguide that bypasses the terrace and guides a test local light to the optical circuit to be tested, and a grating coupler that inputs the test local light to the testing optical waveguide; and testing the optical circuit by supplying the test local light, via the grating coupler, to the testing optical waveguide.

* * * * *